May 26, 1942.    W. B. CONNOLLY    2,284,045
AMMETER
Filed July 22, 1940    2 Sheets-Sheet 1

INVENTOR
William B. Connolly
BY
ATTORNEY

May 26, 1942.  W. B. CONNOLLY  2,284,045
AMMETER
Filed July 22, 1940  2 Sheets-Sheet 2

INVENTOR
William B. Connolly
BY
ATTORNEY

Patented May 26, 1942

2,284,045

UNITED STATES PATENT OFFICE 2,284,045

AMMETER

William B. Connolly, Rochester, N. Y., assignor to Rochester Manufacturing Co. Incorporated, Rochester, N. Y.

Application July 22, 1940, Serial No. 346,823

14 Claims. (Cl. 171—34)

This invention relates to electric current responsive devices such as ammeters, and one of the objects of the invention is to provide the instrument with a novel and sturdy mechanical and electrical construction which makes it especially adapted for use as an automotive type ammeter in tractors, trucks and other self propelled vehicles or in connection with engines in which the ammeter is subjected to excessive shock and vibration.

Another object of this invention is to provide the instrument with a very steady magnetically "dampened" pointer action.

A further object of this invention is to provide an ammeter construction for the accurate operation of the pointer without the use of jewel bearings, hardened cone bearings and delicate operating members.

Another object of this invention is to provide an ammeter in which the pointer turning torque is applied to one end only of the magnetized operating member in order to effect a "steady" indication by the pointer without the use of air vane dampers etc.

Another object of this invention is to provide an ammeter construction which permits the use of relatively strong magnetic fields in both the field coil and the restraining magnet in order to produce accurate indications with ruggedly constructed electrical and mechanical operating members.

Another object of this invention is to provide the ammeter with a full floating indicating pointer assembly which is so arranged in the magnetic field of the permanent magnet as to effect a "dampened" pointer movement in an otherwise mechanically free mounting.

Another object of this invention is to provide an ammeter construction in which the armature and pointer are combined in one hardened steel magnetized member in the form of a comparatively long unequal length lever arm pointer with a resulting steady movement which is not appreciably affected by shock and vibration.

Another object of this invention is to provide an ammeter construction in which the field coil assembly is universally adjustable on its support for quick and accurate calibration.

A still further object of this invention is to provide an ammeter construction with a permanent magnet in which the poles are so arranged, relative to the field coil and steel case, that the magnetic flux produced by both the "charge" and "discharge" currents in the field coil may partially pass thru the permanent magnet in the direction of its own magnetic field and thus tend to keep the permanent magnet at its maximum strength.

Still another object of this invention is to provide an ammeter construction in which any excessive magnetic flux due to an overload or short circuit will find an easy return magnetic path thru the ammeter steel housing without strain or damage to the meter.

All these and other objects and attendant advantages of this invention will become more readily apparent from the detailed description thereof which follows, reference being had to the accompanying drawings in which Figure 1 is a top plan view of an ammeter embodying my invention, the dial being omitted from the ammeter.

Figure 1:
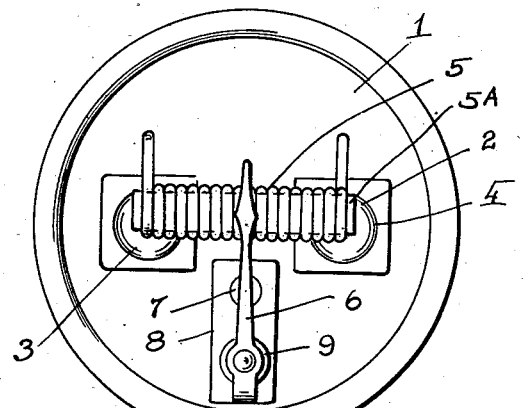

As illustrated in these figures the ammeter comprises a housing 1, preferably of soft sheet steel, and projecting from the bottom of this housing are the terminal posts 2 and 3. Each of these terminal posts is made up in the form of a threaded stud which passes thru the bottom of the housing and carries a slotted head 4 on the inside of the housing. The terminal posts are rigidly anchored in suitable recesses in the housing and are electrically insulated in the bottom of the housing and the clamping nuts threaded on the terminal posts on the outside of the housing provide the fastening means for electrical connections.

An electromagnetic coil 5 is wound with a heavy, insulated wire over the soft iron core 5A to provide the field coil for the ammeter. The heavy but pliable copper wire used for the coil serves also as its supporting means and the terminal ends are looped from the coil to their connection with the heads 4 in order to make their supporting connection flexible and universally adjustable. The terminal ends of the coil engage into the slots of the heads 4 and are staked and soldered thereinto to provide a mechanically strong and an electrically efficient connection with the terminal posts 2 and 3.

Figure 2:
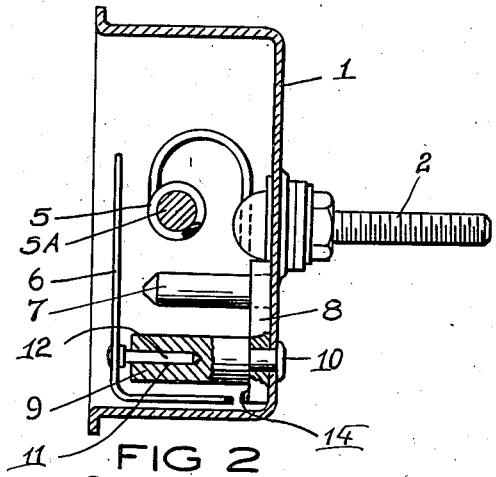
Figure 2 is a sectional view of this ammeter.

The ammeter is provided with the three pole magnetic member 6 which serves both as an armature and pointer. This member is normally held in the magnetic field of a permanent magnet 7 which, in the form illustrated in figures 1 and 2, comprises a short bar magnet held erect on the soft steel base 8. The latter is fastened to the bottom of the case and is at the same time radially adjustable relative to the non-magnetic post 9 which has its reduced end passed thru the soft steel base and the bottom of the case with a head 10 formed on the outside of the casing. The non-magnetic post has an elongated bearing 11 in the outer free end and in this bearing is mounted the pointer stem 12. The latter carries the substantially L shaped three pole magnetic pointer 6 to have one portion extend spacedly over one pole of the permanent magnet 7 and the end over the electromagnetic coil 5 and have the other portion extend parallel to the post 9 with its end into close proximity to a pointer lug or pole 14 struck up from the soft steel base 8. In this way a magnetic gap between the pole at the free end of the bar magnet 7 and the pointer 6 and another magnetic gap between one end of the L shaped pointer and the pointed lug or pole 14 of the steel base 8 provide for a normal path of magnetic flux thru a portion of the magnetic pointer from one pole of the permanent magnet to the other. The pointer is thus yieldingly held in a normally fixed position in the magnetic field of the permanent magnet. In this position the indicating end of the pointer extends partially or entirely over the electromagnetic coil 5 suitably spaced from it and substantially at the middle thereof. In this way the pointer is normally located in the middle of the magnetic field of the coil for movement toward either pole depending on the direction of the magnetic field which is set up by the current in passing thru the coil.

The radial adjustment of the permanent magnet and its field provides for a quick and accurate normal zero setting of the pointer and the universal adjustment of the electromagnetic coil on its bendable terminal ends permits a quick and accurate calibration for a uniform movement of the pointer by the magnetic field of the electromagnetic coil in either direction from its central zero position over the electromagnetic coil, so that current passing thru the electromagnetic coil will cause the pointer to swing within the magnetic field of the permanent magnet. The pointer is deflected in opposite directions by the "charge" and "discharge" currents passing thru the ammeter. The movement of the pointer is "dampened" by the unbalanced action of the magnetic field of the permanent magnet on the pointer with the result that the movement of the pointer is extremely steady. The action of the permanent magnetic field on the magnetized pointer also holds its pointer stem pivotally balanced in place in the bearing 11. The action of the magnetic field of the electromagnet coil affects but a portion of the pointer, preferably the outer end thereof, with the result that a steady movement of the pointer is effected thereby.

Figure 3:
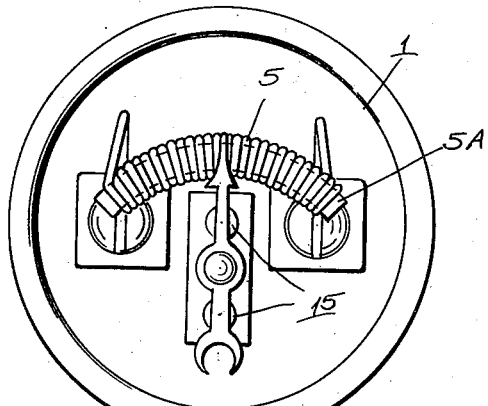
Figure 3 is a top plan view of a modified form of the ammeter without its dial.
Figure 4:
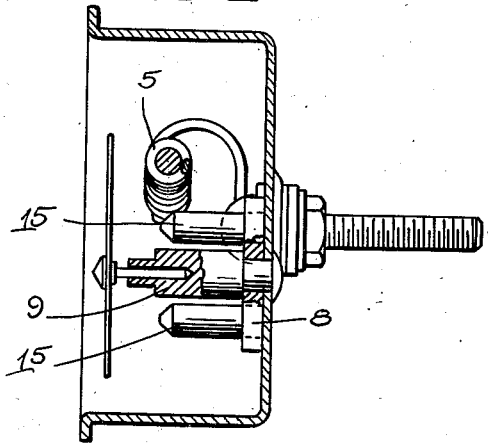
Figure 4 is a sectional view thereof.

In the construction of the ammeter illustrated in Figures 3 and 4, two bar magnets 15, 15 are mounted on the steel base 8, one on each side of the non-magnetic bearing post 9. The magnetic pointer is pivoted intermediate of both poles of the magnet so that the magnetic flux from one pole to the other passes partially thru substantially the middle portion of the pointer to yieldingly hold it in its normally fixed position and provide a magnetic field which will efficiently dampen the movement of the pointer when it is moved by the magnetic field of the electromagnetic coil on the energization thereof.

Figure 5:
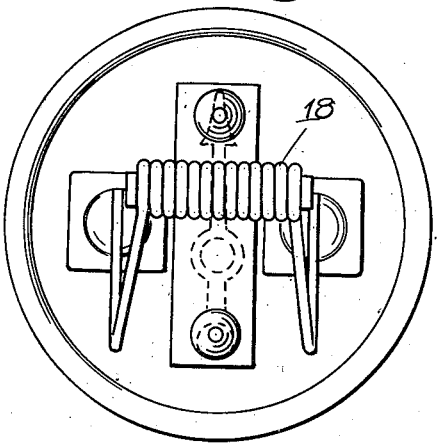
Figure 5 is a top plan view of another modified form of the ammeter without its dial and indicating pointer.
Figure 6:
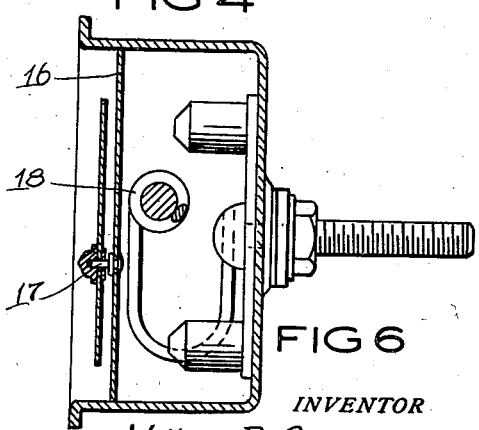
Figure 6 is a sectional view of this ammeter with its dial and indicating pointer.

In the modified construction of the ammeter illustrated in Figures 5 and 6, the magnetic pointer is pivotally supported on the indicating dial 16 by means of the pivot post 17. Two permanent bar magnets are used for holding the magnetic pointer in its normally fixed position. The bar magnets are mounted on the soft steel base 8 and are spaced thereon so as to be located opposite the ends of the pointer. In this way the electromagnetic coil 18 may be placed intermediate the permanent bar magnets and have its magnetic flux act on the magnetic pointer intermediate the ends for its movement thereby.

In Figure 3 the electromagnetic coil is curved substantially concentric to the center of rotation of the magnetic pointer so that its outer end, which is affected by the magnetic flux from the coil, moves substantially uniformly in the magnetic field of the electromagnetic coil.

As will be seen from an inspection of the figures of the drawings, the arrangement of the permanent bar magnets is such that both of their poles are spaced from the poles of the electromagnetic coil so that no matter in which direction the electromagnetic coil is energized, some of the variable magnetic flux from its poles will pass into the case and thru the permanent magnet in the direction of its own magnetic flux. The magnetic flux in the permanent magnet is thus maintained at a maximum strength at all times.

It will also be noted that the poles of the electromagnet coil are located in substantially close proximity to the wall of the soft steel ammeter housing. Should, therefore, an excess electric current, due to a short circuit in the line, pass thru the coil, the increased magnetic flux will simply "spill" over into the steel housing so as to provide a by-pass for the increased magnetic flux from one pole to the other. In this way an excess magnetic flux cannot affect or "strain" the magnetic pointer in a manner that will prevent its accurate movement thereafter.

Figure 7:
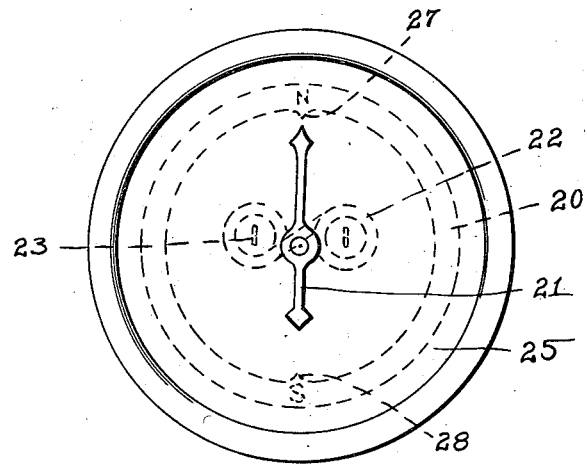
Figure 7 is a top plan view of still another modified form of the ammeter.
Figure 8:
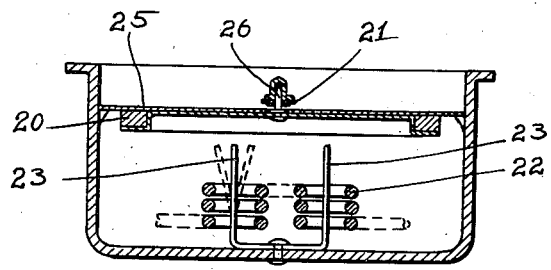
Figure 8 is a sectional view thereof.

In the modification illustrated in Figures 7 and 8, a ring shaped permanent magnet 20 provides the permanent magnetic field which operates to hold the magnetic pointer 21 in its normal zero position and magnetically dampens its movement on its operation by the magnetic field of the coil 22. The latter is divided and encircles the cores 23, 23 of the U shaped field core 24 which is fastened for pivotal adjustment to the bottom of the ammeter casing. The core and its field coil are located slightly "off" center relative to the center of rotation of the pointer 21. This arrangement together with the unequal "center to end" lengths of the pointer 21 results in a "damped" pointer movement which action is not obtainable when the field coil centered relative to the center of rotation of the pointer and the pointer extends equal distances from this center of rotation.

The cores 23, 23 of the armature of the field coil are bendable as illustrated in dotted lines in Figure 8 to provide for a quick and easy calibration of the ammeter. The permanent ring magnet 20 is suitably held against the under side of the dial 25 and the pointer 21 is pivoted on the pivot pin 26 located and supported centrally of the dial. Suitable pole points 27 and 28 are provided on the inner perimeter of the ring magnet for the magnetic north and south pole thereof.

From the foregoing it will be apparent that the ammeter shown and described embodies the features and advantages enumerated as desirable in the statement of the invention and the above description, and while, in the present instance, preferred embodiments thereof are shown and described which will give in practice satisfactory and reliable results, it is to be understood that these embodiments are susceptible of modification in various particulars without departing from the spirit or scope of the invention or sacrificing any of its advantages.

I claim:

1. An electric current indicating device comprising a housing having a base, a magnetized, hardened steel indicating pointer mounted to swing in said housing in a plane substantially parallel to the base thereof, a permanent magnet mounted between said pointer and said base and with its magnetic poles arranged to provide a substantially constant magnetic coupling with a portion of said magnetized pointer for magnetically holding said pointer in a normal predetermined position and magnetically dampening its movement from this position, an electromagnetic coil, and a soft iron core carried by said coil, said electromagnetic coil being arranged intermediate the pointer and the base of the housing and spaced from said permanent magnet to provide a variable magnetic coupling with a portion of said magnetized pointer unaffected by said permanent magnetic coupling so as to cause magnetically dampened movement of the pointer portion located within the magnetic field of said permanent magnet when said electromagnetic coil is electrically energized.

2. An electric current indicating device as set forth in claim 1 in which said permanent magnet is adjustable in a plane parallel to the plane of movement of said pointer for positioning said pointer.

3. An electric current indicating device as set forth in claim 1 in which said permanent magnet is mounted at right angles to the base of said housing and said magnetic coil is arranged in a plane parallel to the movement of said pointer and under one end of said pointer.

4. An electric current indicating device as set forth in claim 1 in which said permanent magnet is a closed ring shape, and said magnetic coil is arranged at right angles thereto within said ring shaped magnet.

5. An electric current indicating device as set forth in claim 1 in which said permanent magnet and said electromagnetic coil are so arranged relative to said magnetic pointer that the electromagnetic coil torque on the pointer end effects a pull on the pointer to one side of the bearing thereof and in a plane at right angles to its movement to cause a mechaniically dampened movement thereof by providing a binding action in its pivotal support.

6. An electric indicating device comprising a soft steel housing having a base, a magnetized hardened steel indicating pointer mounted to swing in said housing, a permanent magnet mounted on said base and arranged in said housing to provide a constant magnetic coupling with a portion of said pointer for magnetically holding said pointer in a normal predetermined position, an electromagnetic coil, and a soft iron core carried by said electromagnetic coil, said electromagnetic coil with its core being arranged relative to said magnetized pointer to provide a variable magnetic coupling with another portion of said pointer for the movement thereof when said electromagnetic coil is normally energized, and the poles of said electromagnetic coil being arranged relative to the walls of said soft steel housing to provide a magnetic coupling between said electromagnetic coil and said housing when said electromagnetic coil is electrically overenergized.

7. An electric current indicating device comprising a soft steel housing including a base, a three pole magnetic pointer mounted to swing in said housing in a plane parallel to said base, a permanent magnet arranged to provide a constant magnetic coupling with two poles of said pointer and an electromagnet extending in a plane parallel to the movement of said pointer for variable magnetic coupling with the third of its poles, the poles of the electromagnet being substantially uniformly spaced from the wall of said soft steel housing to provide a magnetic bi-pass circuit between the poles of the electromagnet and the steel housing so that a portion of the magnetic lines of force will pass through the housing and merge or align with those of the permanent magnet and pointer regardless of direction of current flow to thereby maintain the pointer and permanent magnet at maximum magnetic strength.

8. An electric current indicating device comprising a housing, a magnetic pointer mounted to swing in said housing, an electromagnet extending in a plane parallel to the plane of movement of said pointer and spacedly arranged to said pointer to provide a variable magnetic coupling between said pointer and said electromagnet for movement of said pointer when said electromagnet is energized, a two section permanent magnet at right angles to the bottom of the housing, a soft steel member connecting said magnets in said housing and holding said magnets at right angles to said pointer to provide a constant magnetic coupling between the pointer and the poles of said magnet.

9. An electric current indicating device as set forth in claim 8 in which the poles of the two section permanent magnet are substantially equally spaced from each of the poles of said electromagnet and are arranged substantially at right angles thereto.

10. An electric current indicating device comprising a housing having a base, a non-magnetic bearing member mounted erect on the base of said housing, a three pole magnetized steel pointer journaled in said bearing member with the pointer swinging in a plane at right angles to the bearing member, an electromagnet extending in a plane parallel to the plane of movement of said pointer spaced from said pointer for variable magnetic coupling with one of the poles of said pointer for movement of the pointer when said electromagnet is energized, and a permanent magnet arranged relative to the bearing member to provide a constant magnetic coupling with the other two poles of said pointer and hold said pointer journaled in said bearing in a normal predetermined position.

11. An electric current indicating device comprising a housing, a three pole magnetic pointer journaled intermediate its ends in said housing, a 2-section permanent magnet with a soft steel yoke arranged to have one of its poles magnetically coupled with one pole of said pointer intermediate the ends thereof and the other of its poles magnetically coupled with another of the poles at one end thereof so as to hold said pointer in a normally fixed position magnetically coupled with said permanent magnet, and an electromagnet arranged in a plane parallel to the plane of movement of the pointer relative to the third pole at the indicating end of the pointer to provide a variable magnetic coupling between the indicating end of the pointer and the electromagnet for a magnetically dampened movement of the pointer in the magnetic field of said permanent magnet.

12. An electric current indicating device comprising a housing, a non-magnetic bearing member mounted erect on the base of said housing, a substantially L shaped three pole permanent magnet pointer journaled in said bearing with one section thereof extending parallel to said bearing member and one magnetic pole at the outer end of said section, the other section of said pointer extending at right angles to said first named section with a second magnetic pole provided intermediate the ends thereof, a permanent magnet arranged relative to said pointer to provide a magnetic coupling between said two poles of the two sections of said pointer and said magnet, and an electromagnet extending in a plane parallel to the plane of movement of said pointer and arranged for variable magnetic coupling with the third pole provided in the second mentioned section of said pointer.

13. An electric current indicating device as set forth in claim 1 in which the electromagnet coil and core are substantially concentric with the pointer movement.

14. In an electric current indicating device; the combination of a soft steel housing having a base; a substantially L shaped combined pointer and restraining member magnetized to provide three permanent magnetic poles in said combined pointer and restraining member; pivot means for said combined pointer and restraining member extending axially parallel to the bent end thereof; a permanent magnet held erect in said housing and arranged on its base to provide magnetic coupling with two of the poles of said combined pointer and restraining member, an electromagnetic coil; a soft iron core in said coil; said coil and its core being arranged in said housing for magnetic coupling with the third magnetic pole of said combined pointer and restraining member and with the poles of the core arranged to have magnetic flux flow into the wall of the housing to the base thereof and thru the permanent magnet and a portion of the combined pointer and restraining member back to the electromagnetic coil to thereby constantly effect a stabilization of the permanent magnet and the combined pointer and restraining member.

WILLIAM B. CONNOLLY.